Nov. 14, 1939.  A. E. GLANCY ET AL  2,180,003
OPHTHALMIC LENS
Filed March 12, 1937  2 Sheets-Sheet 1
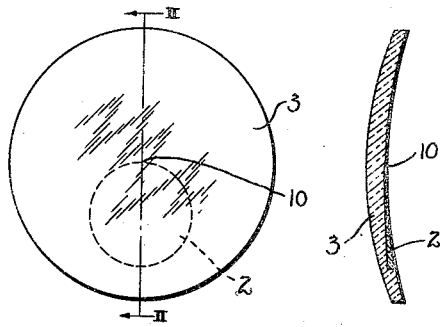
Fig. I  Fig. II
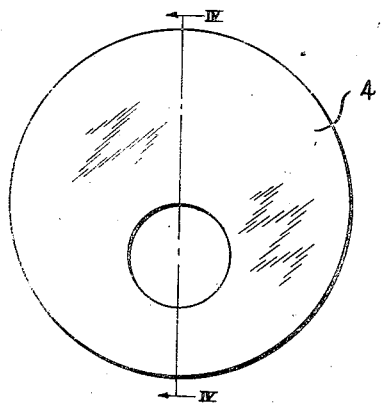
Fig. III
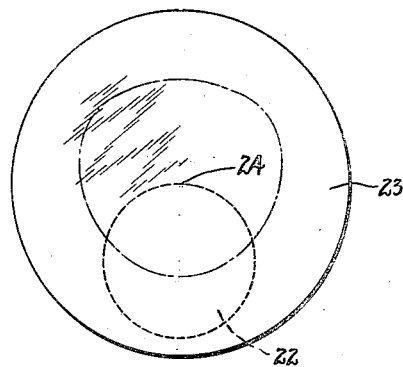
Fig. VII
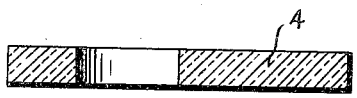
Fig. IV
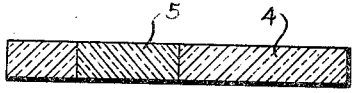
Fig. V
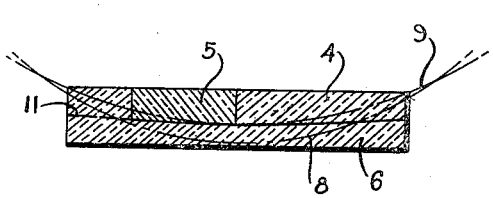
Fig. VI
INVENTOR
ANNA E. GLANCY
LOUIS L. GAGNON
BY
Harry H. Styll
ATTORNEY Nov. 14, 1939.  A. E. GLANCY ET AL  2,180,003
OPHTHALMIC LENS
Filed March 12, 1937  2 Sheets-Sheet 2
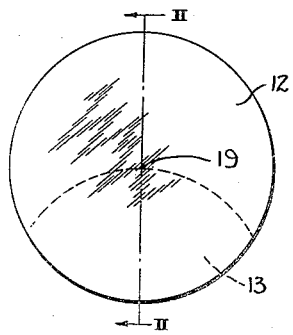
Fig. VIII
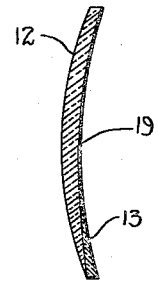
Fig. IX
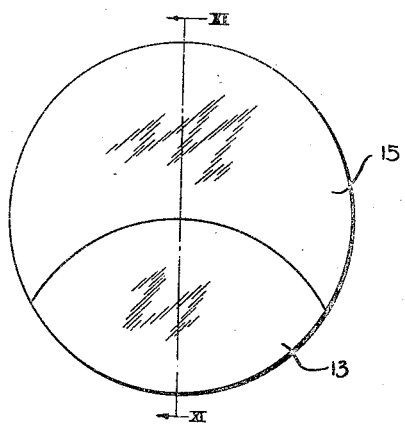
Fig. X
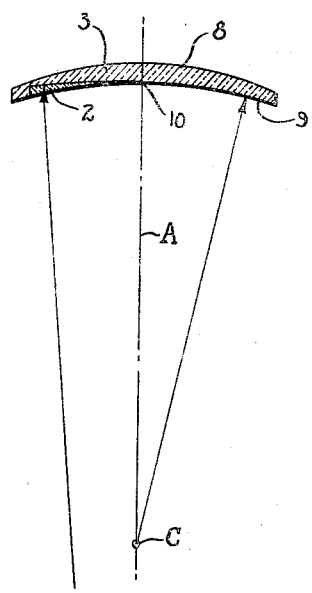
Fig. XIII
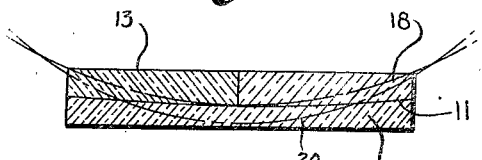
Fig. XI
Fig. XII
INVENTOR
ANNA E. GLANCY
LOUIS L. GAGNON
BY Harry H. Still
ATTORNEY Patented Nov. 14, 1939

2,180,003

UNITED STATES PATENT OFFICE 2,180,003

OPHTHALMIC LENS

Anna Estelle Glancy and Louis L. Gagnon, Southbridge, Mass., assignors to American Optical Company, Southbridge, Mass., a voluntary association of Massachusetts Application March 12, 1937, Serial No. 130,539

4 Claims. (Cl. 88—54)

This invention relates to a multifocal ophthalmic lens, and more particularly to a bifocal ophthalmic lens and method of making the same.

An object of the invention is to provide a lens which is substantially free from "jump" when passing from one focal field to the other and which at the same time has a dividing line between the fields which has minimum visibility.

Another object is to provide a multifocal lens of the type having one focal field formed of a fused-in piece of glass of a different index of refraction wherein the said focal fields are non-axially arranged.

In the accompanying drawings which illustrate the invention:

Fig. I is a front view of a lens embodying the invention;

Fig. II is a view in section on the line II—II of Fig. I;

Fig. III is a plan view of a blank having a perforation therein for receiving the segment for the minor field;

Fig. IV is a sectional view of the line IV—IV of Fig. III;

Fig. V is a sectional view through the same blank after the insertion of the segment;

Fig. VI is a sectional view through a composite of the blank of Fig. V fused to a second blank, the surface of the finished lens being indicated in this figure by chain lines;

Fig. VII is a view similar to Fig. I showing a similar lens in which the segment however is somewhat larger, and in this figure the shape to which the lens is trimmed for use in an ophthalmic mounting is indicated by a dot and dash line;

Fig. VIII is a view similar to Fig. I of another embodiment of our invention;

Fig. IX is a view in section on the line IX—IX of Fig. VIII;

Fig. X is a plan view of a two-part blank which is to enter into the production of the lens;

Fig. XI is a view in section on the line II—II of Fig. X; and

Fig. XII is a similar sectional view of a composite of the blank of Fig. XI fused to a second blank.

Fig. XIII is a diagrammatic view illustrating the relation of the centers of the various surface curvatures of the lens.

One of the important features of the invention, namely, minimum visibility of the border of the minor portion of the lens, is in part due to the fact that the major portion of glass has a higher index of refraction than the minor segment and the latter is so fixed in the major portion as to be thinned out toward the border line over which the eye passes in moving from one field to the other, that is, which is remote from the periphery of the lens. This will be more readily understood by a description of two methods by which a lens embodying the invention may be produced. Referring first to Figs. III to VI inclusive, the method of producing either the lens illustrated in Figs I and II or the lens illustrated in Fig. VII will be described.

As above mentioned, the major portion is to be of glass of a higher index of refraction than the glass of the minor segment. In the selection of the particular compositions used, it is well to select glasses whose relative dispersions are such that in the finished lens a minimum of color is produced in the field which has superposed layers of glasses of different composition. For convenience this field will in the remainder of the specification be termed the reading field, although the user of the ophthalmic lenses may employ them for other purposes than reading. As an example of two compositions of glass which combine for good results in a bifocal lens, ophthalmic crown glass having an index of refraction substantially 1.523 is employed for the minor segment 2 and barium crown glass having an index of refraction of substantially 1.616 is employed for the major portion 3.

A blank 4 of barium crown glass is provided, as shown in Figs. III and IV, with a perforation of required size for accommodating the minor segment 2. A button 5 is fused in the perforation in the blank 4 (as illustrated in Fig. V), this button being of ophthalmic crown glass to form the segment 2.

There are two alternative methods for producing a two-part blank such as illustrated in Fig. V. Instead of carrying the perforation clear through the blank 4, a punch may be employed which travels less than the full distance through the blank 4, thus providing a socket for receiving the button 5. The latter is fused in this socket and of course fuses both to the side walls and to the bottom of the socket. The glass pushed out of the blank by the punch is ground away after the fusing operation and that side of the blank 4 is also surfaced. It is convenient to at this time produce on this side of the two-part blank 4, 5 the optical surface 11 which is referred to at a later point in the description of this process.

The other of the alternative methods is to limit the travel of the punch as above described so as to form the socket having as its bottom the incompletely severed glass. The displaced glass is then ground away and that side of the blank surfaced to expose the opening in the blank 4, with the result that a perforated blank such as illustrated in Fig. IV is produced. A button 5 is then fused in the perforation in the blank 4 to produce a two-part blank 4, 5. The blank having the button 5 inserted therein, is then secured to a second blank 6 of barium crown glass. The preferable way of securing the blanks 4 and 6 together is to produce substantially contrageneric optical surfaces on the blanks 4 and 6 and to fuse the two blanks together. The calculation of the curvature of these contrageneric surfaces must take into account the outer optical curvature which are to be formed to complete the lens and the indices of refraction of the glasses. These contrageneric surfaces may be planes. It will be apparent that the more nearly the curvature of the contrageneric surfaces approximates the curvature of the ocular surface of the finished lens the more nearly the two fields become of the same focal power.

Fig. VI diagrammatically illustrates the blanks 4 and 6 fused together the solid line 11 indicating the fused contrageneric surfaces. Since all but the segment 5 is of glass of substantially the same index of refraction, the surface of separation between the blanks 4 and 6 disappears except for the interface between segment 5 and the overlying glass of blank 6 (compare Fig. II). Fig. VI also indicates to what extent glass is removed to produce the front and ocular surfaces of the finished lens, the broken line 8 indicating the front surface of the finished lens, and the broken line 9 indicating the ocular surface of the finished lens. Grinding of the ocular side of the blank may be carried far enough to reduce the thickness of the segment 5 to a minimum at the point 10.

There are certain precautions to be taken in the surfacing of the blanks 4 and 6 and in the production of the ocular surface 9 in order that there shall be a minimum of "jump" in the finished lens. This will be explained in connection with Fig. XIII. The axis A of the segment should pass approximately through the edge of the segment 2 as shown in Fig. XIII. If the contrageneric surfaces on the blanks 4 and 6 are planes, the above mentioned axis A should be perpendicular to these planes. If these contrageneric surfaces are not planes their common center of curvature should be on the above mentioned axis A. This axis is, according to known principles, determined by the common center of curvature of the contrageneric surfaces and the center of curvature C of the surface 9 (see Fig. XIII). According to customary practice the blanks 4 and 6 are mounted to rotate about the above mentioned axis while the contrageneric surfaces are being produced; and furthermore the composite of the blanks 4 and 6 is mounted for rotation about this same axis while the ocular surface 9 is being produced. As above specified this axis A is so arranged as to pass approximately through the border of the segment 2 and preferably in the proximity of the point 10.

Having established this axis according to this teaching, there is no "jump" or a minimum of jump in passing from one field to the other, whether or not the front surface 8 of the lens be centered on this same axis A. This is an important advantage of a lens embodying the invention, since there is considerable latitude in placing the interface 11, namely, the contrageneric surfaces above referred to as will later be explained.

The lens shown in Figs. VIII and IX differs from the lens shown in Figs. I and II principally in the shape of the reading field. The major portion 12 is of glass of a higher index of refraction than that of the glass of which the minor segment 13 is made. Figs. X to XII inclusive illustrate the process by which this embodiment of the invention may be produced. A two-part button such as shown in Fig. X is produced by cutting away a segmental portion of a blank 15 and replacing the portion which was cut away by a minor segment 13 of glass of a suitable index of refraction. Herein it will be assumed that the blank 15 is of barium crown glass and that the segment 13 is of ophthalmic crown glass and that the two glasses are fused together in the edge abutting relation shown in Fig. X. The two-part blank 15, 13 is then fused to a second blank 16. The same procedure is followed as explained in connection with Figs. V and VI, the blank 15, 13 taking the place of the blank 4, 5 in that procedure. Here the contrageneric surfaces 11 are so oriented as to have a common center of curvature on the axis A above referred to. An ocular surface 18 is produced having a center on the said axis A. It has been explained above that according to the usual practice the contrageneric surfaces and the ocular surface 18 are produced by mounting the blanks or the composite as the case may be for rotation about this axis. Grinding of the ocular surface 18 may be carried far enough so as to reduce the edge of the segment 13 substantially to a knife edge adjacent the point 19. This knifelike edge thickens progressively in going in either direction along this line from the point 19. In the part of the lens most used by the eye however, the visibility of the line of separation is at a minimum. The front surface of the finished lens is indicated in Fig. XII by the broken line 20.

It is noteworthy that the lens need not be finished at the factory. As soon as the blank has received the optical surface 9 or 18 it may be placed in stock or shipped to whoever carries on the business of finishing bifocal lenses to prescription. When a prescription is to be filled, the lens is taken out of stock or is obtained from the factory, and then the remaining surface 8 or 20 is placed on the blank to finish the lens to the prescription.

The shape of the segment 13 may be varied to a considerable extent to meet a demand for different shapes of reading field. This is true likewise of the segment 2 in the embodiment shown in Figs. I and II. In order to change the shape of the segment 2 the shape of the punch used in forming the opening in the blank 4 is correspondingly changed and the contour of the button 5 changed to correspond to this changed shape of opening. It is furthermore possible to eliminate the thickest portion of the line of separation between the two fields by the way in which the lens is trimmed or edged. An example of this is illustrated in Fig. VII in which a somewhat larger segment 22 than the segment 2 is embedded in the major portion 23. The thinnest portion of the line of separation between the two fields of the lens will be in the neighborhood of the point 24. The chain line in Fig. VII indicates that the lens may be trimmed by cutting along this chain line so as to eliminate the greater portion of the line of separation which has substantial thickness. The chain line as illustrated in Fig. VII surrounds a well known shape of ophthalmic lens.

While the trimming of the blank shown in Fig. XII is not indicated, it is obvious that in laying out the shape of the lens on the blank, any portion of the latter in which the segment 13 is exposed on the front face should be eliminated if a trifocal lens is to be avoided. In order to include just the segment desired and also have the required size of major portion in the finished lens, it may be necessary for the designer to increase the thickness of the finished lens. These and other expedients are within the skill of those versed in such matters.

An important advantage of a bifocal lens according to the teaching given herein is that the segment may be produced with prism, either base in or base out. This prism is produced in the course of manufacture of the lens blank and the amount of prism is not later changed by the surfacing of the lens when the prescription curve is placed on the lens.

The lens is generally in such a position relative to the wearer's eye that the light passing through the segment to the eye is at such an angle as to produce a slight astigmatic effect in the reading field. This can be compensated by grinding the interface 11 toric as taught in Tillyer Patent #1,593,198 or #1,593,199, dated July 20, 1926.

The surface 20, which may be termed the prescription surface because it may be left to be ground by whoever finishes the lens to prescription, may be so shaped as to introduce overall prisms in the lens, or similarly to introduce cylinder, these being produced in well known manner. Moreover, the lens may be rendered protective against ultra-violet or infra red rays by using glass which absorbs such rays. If desired, glass with suitable color may be used for transmitting light of controlled color.

An important advantage of the invention is the low visibility of the dividing line between the fields of the lens. This important advantage is not obtained at the sacrifice of the monaxial characteristics of the lens, since as above explained there is substantially no jump in passing from one field to the other.

While certain preferred embodiments of the invention have been illustrated and described it will be understood that the invention may be otherwise embodied and practiced within the scope of the claims:

We claim:

1. A blank for a multifocal lens having a relatively large distance vision field and an associated near vision field, comprising a piece of lens medium of a relatively high index of refraction joined in edge to edge relation with another piece of lens medium of a lower index of refraction along a line which is to constitute in part the shape and size of the resultant near vision field of the lens, said composite pieces of lens medium having a continuous surface on one side thereof which is of a given radius so as to control in part the resultant focal power of said near vision field, a second major piece of lens medium of sensibly the same index of refraction as the first high index piece of lens medium secured to said continuous surface and overlying the low index piece of lens medium, said composite pieces of lens medium having an exposed surface curvature of a radius which is shorter than the radius of curvature of the first continuous surface, said exposed surface curvature extending over the low index piece of lens medium and intersecting said first continuous surface substantially at the point of joinder of said edge to edge joined pieces of lens medium thereby reducing said low index piece of lens medium to a substantially knifelike edge at said point and simultaneously producing a controlling element of the resultant focal power desired of the distance vision portion of the lens, said exposed surface intersecting said first continuous surface adjacent the edge of said low index piece of lens medium disposed towards the center of the blank and producing a controlling element of the resultant location of the optical center of the distance and near vision portions of the lens and controlling in part the positioning of the optical centers of the distance and near vision portions of the lens subtantially at the point of joinder, said second major piece of lens medium of sensibly the same index of refraction as the first high index piece of lens medium, in the finished lens, being of such an index as compared with the superimposed lower index piece of lens medium as to produce a major controlling factor of the resultant focal power of the near vision field.

2. A multifocal lens having a relatively large distance vision field and an associated near vision field, comprising a piece of lens medium of a relatively high index of refraction joined in edge to edge relation with another piece of lens medium of a lower index of refraction along a line which is to constitute in part the shape and size of the resultant near vision field of the lens, said composite pieces of lens medium having a continuous surface on one side thereof which is of a given radius so as to control in part the resultant focal power of said near vision field, a second major piece of lens medium of sensibly the same index of refraction as the first high index piece of lens medium secured to said continuous surface and overlying the minor low index piece of lens medium, said composite pieces of lens medium having an exposed surface curvature of a radius which is shorter than the radius of curvature of the first continuous surface, said exposed surface curvature extending over the low index piece of lens medium and intersecting said first continuous surface substantially at the point of joinder of said edge to edge joined pieces of lens medium thereby reducing said low index piece of lens medium to a substantially knifelike edge at said point and simultaneously producing a controlling element of the resultant focal power desired of the distance vision portion of the lens, said exposed surface intersecting said first continuous surface adjacent the edge of said low index piece of lens medium disposed towards the center of the lens and producing a controlling element of the resultant location of the optical center of the distance and near vision portions of the lens and controlling in part the positioning of the optical centers of the distance and near vision portions of the lens substantially at the point of joinder, and an optical surface on the outer side of said second piece of lens medium of a controlled radius of curvature which with the exposed surface on the composite layer will introduce the resultant focal power desired in the distance and near vision fields of the lens, said second major piece of lens medium of sensibly the same index of refraction as the first high index piece of lens medium, in the finished lens, being of such an index as compared with the superimposed lower index piece of lens medium as to produce a major controlling factor of the resultant focal power of the near vision field.

3. The method of forming a blank for a multifocal lens having a relatively large distance vision field and an associated near vision field, comprising forming a piece of lens medium of a relatively high index of refraction with an edge surface shaped substantially to the shape and size of a portion of the resultant near vision field of the lens, shaping another piece of lens medium of a lower index of refraction substantially to fit said edge, securing said pieces of lens medium in edge to edge relation with each other, forming a continuous surface on one side of said composite pieces of lens medium to a given radius to control in part the resultant focal power of said near vision field, securing a second major piece of lens medium of substantially the same index of refraction as the first high index piece to said continuous surface and in superimposed relation with the low index piece of lens medium, forming an exposed surface curvature of a radius which is shorter than the radius of curvature of the first continuous surface on the exposed side of said composite pieces of lens medium so as to intersect said first continuous surface substantially at the point of joinder of said edge to edge joined pieces of lens medium to reduce said low index piece of lens medium to a substantially knife-like edge at said point and to simultaneously produce a controlling element of the resultant focal power desired of the distance vision portion of the lens, said exposed surface intersecting said first continuous surface adjacent the edge of said low index piece of lens medium disposed towards the center of the blank and producing a controlling element of the resultant location of the optical center of the distance and near vision portions of the lens and controlling in part the positioning of the optical centers of the distance and near vision portions of the lens substantially at the point of joinder, said second major piece of lens medium of sensibly the same index of refraction as the first high index piece of lens medium, in the finished lens, being of such an index as compared with the superimposed lower index piece of lens medium as to produce a major controlling factor of the resultant focal power of the near vision field.

4. The method of forming a multifocal lens having a relatively large distance vision field and an associated near vision field, comprising forming a piece of lens medium of a relatively high index of refraction with an edge surface shaped substantially to the shape and size of a portion of the resultant near vision field of the lens, shaping another piece of lens medium of a lower index of refraction substantially to fit said edge, securing said pieces of lens medium in edge to edge relation with each other, forming a continuous surface on one side of said composite pieces of lens medium to a given radius to control in part the resultant focal power of said near vision field, securing a second major piece of lens medium of substantially the same index of refraction as the first high index piece to said continuous surface and in superimposed relation with the low index piece of lens medium, forming an exposed surface curvature of a radius which is shorter than the radius of curvature of the first continuous surface on the exposed side of said composite pieces of lens medium so as to intersect said first continuous surface substantially at the point of joinder of said edge to edge joined pieces of lens medium to reduce said low index piece of lens medium to a substantially knife-like edge at said point and to simultaneously produce a controlling element of the resultant focal power desired of the distance vision portion of the lens, said exposed surface intersecting said first continuous surface adjacent the edge of said first index piece of lens medium disposed towards the center of the blank and producing a controlling element of the resultant location of the optical center of the distance and near vision portions of the lens and controlling in part the postioning of the optical centers of the distance and near vision portions of the lens substantially at the point of joinder, said second major piece of lens medium of sensibly the same index of refraction as the first high index piece of lens medium, in the finished lens, being of such an index as compared with the superimposed lower index piece of lens medium as to produce a major controlling factor of the resultant focal power of the near vision field, and forming an optical surface on the outer side of said second major piece of lens medium, which with the exposed surface of said composite layer, will introduce the resultant focal power desired in the distance and near vision fields of the lens.

ANNA ESTELLE GLANCY.
LOUIS L. GAGNON.